United States Patent Office 2,744,021
Patented May 1, 1956

2,744,021

PROCESS OF MAKING REFRACTORY BRICK AND BRICK

Eduard Bargezi, Radenthein, Carinthia, Austria, assignor to General Refractories Company, Philadelphia, Pa.

No Drawing. Application February 14, 1952, Serial No. 271,650

Claims priority, application Austria June 4, 1951

7 Claims. (Cl. 106—59)

The present invention relates to processes of producing refractory brick from synthetic magnesia and to refractory brick so produced.

A purpose of the invention is to develop improved bonding properties in synthetic magnesia for refractory brick.

A further purpose is to increase the resistance to temperature change of refractory brick made from synthetic magnesia.

A further purpose is to develop a refractory brick from synthetic magnesia which is suitable for lining a cement kiln.

Further purposes appear in the specification and in the claims.

The brick of the present invention is suitable for use in furnace linings, whether it is produced in burned or unburned form. While the brick of the invention is particularly suitable for lining cement kilns it is also suitable for other industrial furnaces such as open hearth steel furnaces.

Magnesium hydroxide or magnesium oxide are produced synthetically from seawater or from solutions of magnesium chloride available in the potassium industry, or from solutions containing magnesium compounds. Magnesia is also produced from dolomite or from combinations of seawater and dolomite. Magnesium oxide is also produced by thermal decomposition of magnesium sulfate. All of these methods produce synthetic magnesia.

Unlike most natural magnesites, and especially unlike crystalline magnesites, which are most suitable for refractories and refractory brick, synthetic magnesia is very pure and does not contain substances which promote or effect sintering or bonding as in natural magnesites.

Furthermore, the mechanical properties of magnesia brick produced from synthetic magnesia are not satisfactory.

Numerous suggestions have been made to overcome these disadvantages. For example, it has been proposed to incorporate sintering agents when producing refractories from synthetic magnesia. For this purpose materials which favorably influence sintering have been added to synthetic magnesia where desired during its manufacture, for instance during or after the precipitation of magnesium hydroxide. The addition of iron oxides has particularly been suggested. In pursuance of this method, it has been proposed to add solutions of iron chloride to the magnesia in order to incorporate iron oxide distributed in fine particles. It has also been proposed to use a solution of iron chloride in such quantities that the burned magnesia contains 2.5% by weight of $Fe_2O_3$ (U. S. Patent No. 2,281,477).

According to another proposal sintered magnesia made from seawater is mixed with powdered iron silicate, so that it is assumed that the conversion products produced are forsterite and magnesium ferrite. According to one embodiment of this method, iron silicate, if desired, in the form of minerals with a low content of alumina, lime and $B_2O_3$ should be used, the iron silicate added mounting to 10% by weight (U. S. Patent No. 2,433,415).

There is further a known method in which lime and substances containing iron oxide are added to synthetic magnesia prior to sintering. According to U. S. Patent No. 1,965,605, lime or compounds yielding lime are added before sintering to synthetic magnesia, which should contain less than 3% by weight of silica, and 4.7 to 9.7% by weight of iron oxide plus alumina are also added. Lime should be added in sufficient amounts so that, after converting all the silica into dicalcium silicate ($2CaO.SiO_2$), there is still a surplus of CaO to react with the iron oxide added to form calcium ferrite, thus accomplishing a good sintering.

Iron oxide may be partly replaced by chrome ore, but the sum of the alumina plus $Cr_2O_3$ must not exceed one-half of the ferric oxide content. Experiments with brick produced according to this method have, however, been very disappointing. Such brick have a very low resistance to changes in temperature. Brick having the following composition by weight:

| | Percent |
|---|---|
| $SiO_2$ | 2.2 |
| $Al_2O_3$ | 2.0 |
| $Fe_2O_3$ | 7.7 |
| CaO | 10.4 |
| MgO | 77.7 |
| Total | 100.0 | show a resistance to change in temperature of only 0 to 5.

U. S. Patent No. 2,537,014 proposes to incorporate 1 to 5% by weight of silica, in the form of a specially finely divided powder of high surface area, into pure magnesia containing not over 2.0% lime, not over about 2% ferric oxide, not over about 1% alumina and 2% silica, all by weight. These additions are preferably admixed in a solution of magnesium salt before magnesium hydroxide is precipitated therefrom.

In German Patent No. 750,654 a process is described for manufacturing granular burned material preferably from magnesia which is not capable of sintering (such as calcined artificial magnesia) at usual burning temperatures. In this process chrome ore or materials rich in chrome spinel, such as slags formed in the production of ferrochromes with low carbon content, are added to very finely ground magnesia (of a particle size about 0.2 mm.) in the same fineness and in amounts from 15 to 50% by weight. Furthermore the silica content of the mixture, calculated on the basis of the calcined material, should be 3 to 10% by weight. The ferrous oxide content should be less than 12% by weight and the mixture should be burned in an oxidizing atmosphere.

From these various proposals it will be evident that the solution of the problem is very difficult.

The present inventor has found that it is necessary to control a plurality of conditions in order to obtain refractory brick from synthetic magnesia which have properties equal to those of natural magnesites of the Austrian type, and especially in order to obtain a resistance to change in temperature equal to or superior to such natural magnesites.

Based upon my research I have concluded that the following three essential conditions must be maintained: (a) The character of the material of the additions must be accurately controlled as explained below; (b) The total quantity of the addition materials is very important and (c) The lime-silica ratio is critical.

In addition to magnesia, which is the main component of the brick produced according to the present invention, the composition must contain not only iron available as ferric oxide in the final product but also other sesquioxides of the class consisting of each and both of the sesquioxides alumina and $Cr_2O_3$.

The ferric oxide content of the brick mixture must not exceed 4% and should be in the range between 1 and 4% by weight, the silica plus lime must not exceed 7% and will desirably be between 1 and 7%, and preferably between 1 and 5%, by weight, and the quantity of the other sesquioxides of the class consisting of each and both of the sesquioxides alumina and $Cr_2O_3$ must range between 3 and 6.5% by weight.

The ratio of lime to silica must be maintained within a range as specified below.

The percentages given herein are percentages by weight based upon the total weight of the mix provided for molding the brick.

Only by adhering strictly to the conditions referred to herein is it generally possible to produce refractory brick from synthetic magnesia which meet the requirements of service for such brick. When such conditions are observed, magnesia refractory brick according to the invention are obtained which are characterized by an extraordinarily high resistance to changes in temperature, particularly of the character encountered in the refractory linings of Portland cement kilns and are therefore specially suited to cement kilns.

The invention relates to a method of producing refractory brick from synthetic magnesia as a base material with additions of bonding agents which form brick, either fired or unfired, which are very suitable for refractory linings of industrial furnaces, including cement kilns and open hearth furnaces. The steps which will ordinarily be employed are as follows:

Additions may desirably be made to the synthetic magnesia prior to sintering. In addition to ferric oxide, these additions adjust the weight ratio of lime to silica in the batch from which the brick are to be made so that such ratio is less than 0.8 lime to 1 silica by weight, and preferably between 0.4 and 0.65 lime to 1 silica by weight. In addition at least one and permissibly both sesquioxides of the class consisting of alumina and $Cr_2O_3$ are added to the magnesia. In the mix prior to molding the ferric oxide content is 1 to 4% by weight, the content of silica plus lime is 1 to 7% by weight and preferably 1 to 5% by weight and the content of the other sesquioxide of the class consisting of each and both of the sesquioxides alumina and $Cr_2O_3$ lies between 3 and 6% by weight.

It is not necessary in producing refractory brick according to the invention to maintain strict observance of grain size as has been usual when alumina is added to magnesia. However, excellent results are obtained using the grain sizes referred to in U. S. Patent No. 2,063,543. Excellent brick with high resistance to change in temperature can be produced according to the invention using sintered or burned magnesia with additives as above referred to, in grain sizes of the mix up to 3 mm. or more consistent with achieving a practical mix.

In this case the ratio of grain sizes advantageously may be as follows: 80% by weight of a size up to 3 mm. or more consistent with achieving a practical mix, and 20% of fine particles up to 0.1 mm. consistent with achieving a practical mix.

The alumina additions may be made in the form of pure alumina or in the form of corundum, bauxite or other aluminiferous substances such as kaolin, high grade chamotte or magnesia spinel. Instead of or in addition to alumina, $Cr_2O_3$ can be added in the form of chrome ore or chrome compounds.

Ferric oxide is preferably added to synthetic magnesia as crushed iron oxide, such as mill scale, hammer scale, high grade iron ore or even as unalloyed scrap iron.

In adjusting the lime-silica ratio the quantities of lime and silica introduced with the above mentioned additions as well as the quantities present in the synthetic magnesia must be taken into consideration. Silica is preferably added to the starting material as siliceous and magnesia-containing ore such as serpentine, talc, soapstone or the like. The metasilicates thus introduced, owing to their low melting points and their capabilities of being converted to highly refractory orthosilicates, promote the sintering process in an advantageous manner.

The additions referred to preferably may be added to the synthetic magnesia prior to sintering or during the sintering process. Part of the additions, particularly ferric oxide or substances yielding ferric oxide and the admixtures necessary to produce the proper quantity of lime plus silica and the proper lime-silica weight ratio, are added to the magnesia preferably prior to or during sintering. The remaining part of the additions, especially the alumina or $Cr_2O_3$ or both, or substances containing these sesquioxides, may suitably be added after sintering to the magnesia grains or to the mixture from which the refractory brick are being molded, although permissibly the sesquioxides may be put in prior to or during sintering.

Refractory brick produced according to the present invention, whether burned or unburned, may be used for the brick work of industrial furnaces, especially for the linings of rotary kilns in the Portland cement industry and for other refractory linings. These brick are especially good in their resistance to changes in temperature.

*Example I*

Synthetic magnesia having the following composition by weight was used:

| | Percent |
|---|---|
| MgO | 84.0 |
| SiO | 0.14 |
| $Fe_2O_3$ | 0.21 |
| $Al_2O_3$ | 0.23 |
| CaO | Traces |
| Ignition loss | 16.80 |
| Total | 101.38 |

Talc, mill scale and chalk were added to the synthetic magnesia in proportions which produced the final composition by weight after ignition without including ignition loss as follows:

| | Percent |
|---|---|
| MgO | 93.5 |
| SiO | 3.0 |
| $Fe_2O_3$ | 2.0 |
| CaO | 1.5 |
| Total | 100.0 |

This mixture was granulated and sintered in a rotary kiln at 1700° C. and the sinter thus obtained was reduced to grain sizes between 0.5 and 2.5 mm. The residue removed by screening was ground to a fine powder with an upper grain size of 0.1 mm. A mixture of 70% by weight of a grain size between 0.5 and 2.5 mm. and 30% of a grain size up to about 0.1 mm. consistent with achieving a practical mix, was mixed with 5% by weight alumina and molded into brick which were burned at usual temperatures of 1400° to 1600° C.

The chemical analysis of the brick was as follows:

| | Percent |
|---|---|
| MgO | 86.55 |
| $SiO_2$ | 3.61 |
| $Fe_2O_3$ | 2.73 |
| CaO | 1.79 |
| $Al_2O_3$ | 5.26 |
| Ignition loss | 0.06 |
| Total | 100.00 |

The lime-silica weight ratio was about 0.5. The brick of this composition were tested for their resistance to changes in temperature and all samples tested stood up for 50 chills. The testing was carried out according to the Austrian spalling test whereby brick are heated to 950° C. and chilled by a blast of cold compressed air (1 atmosphere). Applying this method, the test was stopped after 50 chills, since this was adequate evidence of the resistance of the brick to change in temperature.

*Example II*

Brick with the following composition by weight were made as above indicated:

|  | Percent |
|---|---|
| MgO | 85.12 |
| $SiO_2$ | 3.81 |
| $Fe_2O_3$ | 3.04 |
| CaO | 1.80 |
| $Al_2O_3$ | 6.23 |
| Total | 100.00 |

These brick were made of 70% by weight magnesia particles of a grain size up to 3 mm. consistent with achieving a practical mix, and 30% of magnesia particles finer than 0.1 mm. (in these brick the grain size recommended by U. S. Patent No. 2,063,543 was not employed). These brick also withstood 50 chills.

On the other hand, brick produced using strict attention to the grain size of U. S. Patent No. 2,063,543 and containing 3.30% lime and 3.21% silica with a lime-silica weight ratio of about 1 only stood up under 1 to 15 chills at the most, although all other conditions with the exception of the lime-silica ratio conformed to the conditions of the invention.

A further comparative test was made by producing brick having the following composition by weight:

|  | Percent |
|---|---|
| MgO | 80.56 |
| $SiO_2$ | 3.04 |
| $Fe_2O_3$ | 9.24 |
| $Al_2O_3$ | 5.55 |
| CaO | 1.54 |
| Ignition loss | 0.07 |
| Total | 100.00 |

Although with the exception of the iron content the analysis of this brick corresponds with the requirements of brick in accordance with the invention, the spalling value of this brick was only 2. These tests prove that strict observance of all the requirements referred to is necessary to carry out the invention successfully.

It will be evident that the procedure according to the examples may be followed using $Cr_2O_3$ instead of alumina with similar results. Likewise with similar results the alumina may be partially replaced by $Cr_2O_3$.

It will further be evident that when required to produce the proper limits, lime may be added.

In view of my invention and disclosure variations and modifications to meet individual whim or particular need will doubtless become evident to others skilled in the art, to obtain all or part of the benefits of my invention without copying the process and structure shown, and I therefore claim all such insofar as they fall within the reasonable spirit and scope of my claims.

Having thus described my invention, what I claim as new and desire to secure by Letters Patent is:

1. In the process of producing refractory brick from synthetic magnesia, the steps which consist in adding to the magnesia iron oxide and a material which will adjust the lime-silica weight ratio to between 0.4 and 0.8 to 1, sintering the magnesia and completing the sintering after these additions have been made, adding to the magnesia at any stage before the end of sintering another sesquioxide of the class which consists of each and both of the sesquioxides alumina and $Cr_2O_3$, until the mix contains 1 to 4% ferric oxide, 3 to 6.5% of the other sesquioxide and 1 to 7% of silica plus lime, thus producing bonding properties, and molding the mix into brick.

2. The process, according to claim 1, in which the lime-silica weight ratio is between 0.4 and 0.65 to 1.

3. The process according to claim 1, in which the silica plus lime is in the range from 1 to 5%.

4. The process according to claim 1, in which the magnesia is in the form of granular sintered magnesia at the time that the other sesquioxide is added.

5. A magnesia refractory brick essentially consisting of synthetic magnesia making up the bulk of the brick, 1 to 4% ferric oxide, 3 to 6.5% of another sesquioxide of the class which consists of each and both of the sesquioxides alumina and $Cr_2O_3$, and 1 to 7% of silica plus lime, and has a lime-silica weight ratio less than 0.8 to 1.

6. A refractory brick according to claim 5, in which the lime-silica weight ratio is between 0.4 and 0.65 to 1.

7. A refractory brick according to claim 5, having from 1 to 5% of silica plus lime.

References Cited in the file of this patent

UNITED STATES PATENTS

| 1,525,328 | Sheaffer | Feb. 3, 1925 |
| 1,694,540 | Harr | Dec. 11, 1928 |
| 2,516,249 | Osborn | July 25, 1950 |

FOREIGN PATENTS

| 125,613 | Australia | 1947 |